United States Patent
South et al.

[11] Patent Number: 5,921,523
[45] Date of Patent: Jul. 13, 1999

[54] MOUNT FOR CAMERA-PC TERMINAL

[75] Inventors: Rand A. South, Brighton; J. Michael Spall, Plymouth, both of Mich.

[73] Assignee: Unisys Corporation, Blue Bell, Pa.

[21] Appl. No.: 08/270,851

[22] Filed: Jul. 5, 1994

[51] Int. Cl.⁶ .................................................. F16M 13/00
[52] U.S. Cl. .................. 248/551; 248/186.1; 248/296.1; 248/680; 248/918; 396/419
[58] Field of Search .................... 248/551, 552, 248/553, 680, 121, 125.1, 176.1, 186.1, 296.1, 500, 917, 918; 354/293

[56] References Cited

U.S. PATENT DOCUMENTS

| | | | |
|---|---|---|---|
| 4,398,815 | 8/1983 | Barzee et al. | 354/293 |
| 4,530,584 | 7/1985 | Schmidt | 354/293 |
| 4,579,311 | 4/1986 | Spranza, III | 248/553 |
| 4,696,449 | 9/1987 | Woo et al. | 248/553 |
| 5,012,348 | 4/1991 | Witzel et al. | 354/293 X |
| 5,052,651 | 10/1991 | Guddee | 248/552 |
| 5,076,079 | 12/1991 | Monoson et al. | 248/680 X |
| 5,271,593 | 12/1993 | Kinner et al. | 248/918 X |
| 5,318,257 | 6/1994 | Tani | 248/918 X |
| 5,322,255 | 6/1994 | Garrett | 248/918 X |

*Primary Examiner*—Derek J. Berger
*Attorney, Agent, or Firm*—John J. McCormack; Mark T. Starr; Rocco L. Adornato

[57] ABSTRACT

An arrangement for mounting a computer unit and a camera unit securely on a flat support: I.E., a
  camera mount including a shaft/fixture unit for receiving the camera to be adjustably positioned thereon; and
  planar base to be affixed to said support for engaging the bottom of the computer unit with a pair of computer-enclosing sides coupled to the base, with
  one side including a top portion for engaging the top of the computer and one side adapted to mount the shaft.

21 Claims, 4 Drawing Sheets

SEMI-SECTIONAL ISOMETRIC VIEW OF PREFERRED EMBODIMENT

MOUNT FOR CAMERA-PC TERMINAL

FIELD OF INVENTION

This invention involves mounting a camera onto a video-imaging personal computer. The mount is to be low-cost and stable while minimizing cost and enhancing security against theft. In a preferred application, it facilitates mounting a digital-portrait-camera removably onto a personal computer—both of general known construction—to facilitate on-the-spot issuance of a license (e.g., by motor vehicle authorities).

BACKGROUND, FEATURES

Workers in the fields of camera use, and of small computer terminals are familiar with the many and various applications which are being devised, as the associated hardware becomes more readily available and reasonably priced. Digital, electronic capture of images is changing from a high-cost, technology-intensive operation to a relatively simple and low-cost task which is apt for many repetitive activities found in daily life. The advent of multiple, high-speed digital data communication has made the use of digital imaging more attractive, since it allows one to instantly, reliably transmit captured images over great distances at low cost. Similarly, the advent of powerful, yet affordable personal computers and their associated software has brought advanced techniques for storing and manipulating such captured images, and integrating them electronically and instantaneously (e.g., with other images and related data such as text and numbers).

Our interest is in applying such concepts to various mass-market applications; particularly for developing a portrait-based licensing or like personal identification system. For instance, this teaches a PC network of terminals apt to capture a subject's image and use it to prepare his driver's license. However, workers will realize that there are many related applications in other fields, such as for preparation of other "identity documents" (e.g, credit cards and credentials of many kinds).

Such "identity documents" are presently prepared using a mixture of photographic, printed and handwritten data which must be combined into a single item (a driver's license, for example) by relatively costly and time-consuming methods. The systems we here envision replace a series of processes with a single, digital technique which combines all these separate, conventional elements into a single system which is capable of producing a finished product, doing so almost instantly and at the point of consumer contact.

Workers in the art will readily understand that such a system must be capable of accepting a variety of inputs, depending upon the nature of the credential to be produced. Apart from regular text, which may be simply and reliably produced by relatively conventional digital means, such a system would, ideally, accept an "electronic portrait" of the consumer (typically in color), and incorporate it with text, with handwritten input such as a signature, and with other physical identification indicia such as a fingerprint, retinal scan, or the like. Devices to capture all this various disparate data and render it in a digital form apt for electronic transmission and reproduction are available and may be easily applied in such a system. We prefer to combine all these elements into a system which is driven and monitored by a conventional personal computer, which serves to accept input from the various devices and, by means of custom software (not described here, but well understood in the art), to combine the data in whatever fashion a user may desire. Here, the personal computer is also the means whereby the combined data may be rendered into a tangible credential (license) according to the format desired by the user, and is also the means by which the captured data may be transmitted (in this or other forms), as the user's application dictates.

Workers in the art will immediately realize that such a system is capable of many different configurations, depending upon the nature of the identity-credential (document) to be produced. For example, a system for producing driver's licenses might be required to function as follows:

- to capture a portrait image of the subject, in color;
- to capture a facsimile of his signature,
- to capture images, in color, of other identification indicia presented by the subject, particularly using an off-the-shelf video camera,
- to capture tax and fee information, such as payment means;
- to render all the foregoing in digital form;
- to combine some or all of these items into a single composite data base for the physical credential (the driver's license) and to render that credential in one of several formats (such as a laminated card), quickly, at the point and time of data capture,
- to retain archive records of all these items,
- to transmit some or all of these items to other databases (e.g., for governmental or law-enforcement use); and
- to have the ability to combine all this with other, later-acquired data to form a long-term record regarding the driver, his license, etc. (such as information concerning subsequent driving infractions).

An exemplary preferred layout of such a system, intended for countertop use, is shown in FIG. 3.

Workers will readily understand that such a system should accommodate mass production at reasonable cost in order to be attractive to users. For this reason, we choose to employ, so far as possible, components and devices which are already fully developed and readily available, integrating them into our system by means of software developed for the chosen personal computer. Most of the devices intended for use in such a system (such as signature pads, thumbprint readers and the like) are already fully developed for customer and point-of-sale applications, and present no great difficulty for integration. An exception is the electronic-image capture means (video camera) for capturing the portrait image of each subject in electronic, digital form. For reasons of cost and suitability for the application, we prefer to employ a conventional "television-type" video camera, like those widely available for industrial and consumer use.

Workers will understand that the use of such a camera presents some special problems re mounting and security as integrated with a personal computer. Here, we particularly address these problems:

1. Mounting of Camera

Workers will understand the requirement, in the applications described, for a sturdy stable mounting arrangement, suited to the user's requirements;

Conventionally, such a camera might be mounted on the familiar photographic tripod. But tripods are not particularly suited to our application, since they tend to be costly, not very apt for use in a countertop environment, use too much floor space, are not very robust, and exhibit features which are not required in our application.

2. Security

Security: both the video camera and the associated personal computer should resist tampering and removal. Our preferred system is to be used at the point of contact with the license subjects; typically an environment open to the public. While some dedicated devices in the system (for example, a thumbprint scanner or signature pad) have little or no value to a would-be thief, the video camera and the personal computer are recognized as tempting items. Hence, our preferred system includes features enhancing the security of the camera and the computer.

Accordingly, we seek to address the foregoing and other difficulties by teaching a novel embodiment which combines a personal computer and a video camera in a single, integrated mounting arrangement, one designed to give maximum utility to a user in the applications described, while, also providing good security for the personal computer and the video camera—all at a reasonable cost.

The methods and means discussed herein will be generally understood as constructed and operating as presently known in the art, except where otherwise specified; and with all materials, methods, devices and apparatus herein understood as being implemented by known expedients according to present good practice.

BRIEF DESCRIPTION OF THE DRAWINGS

These and other features of advantage of the present invention will be appreciated by workers as they become better understood by reference to the following detailed descriptions of the present preferred embodiment, which should be considered in conjunction with the accompanying drawings and figures, wherein like reference symbols denote like elements.

FIG. 4 shows a portion of FIG. 2, modified; and

Details of Embodiment

Figure 1:
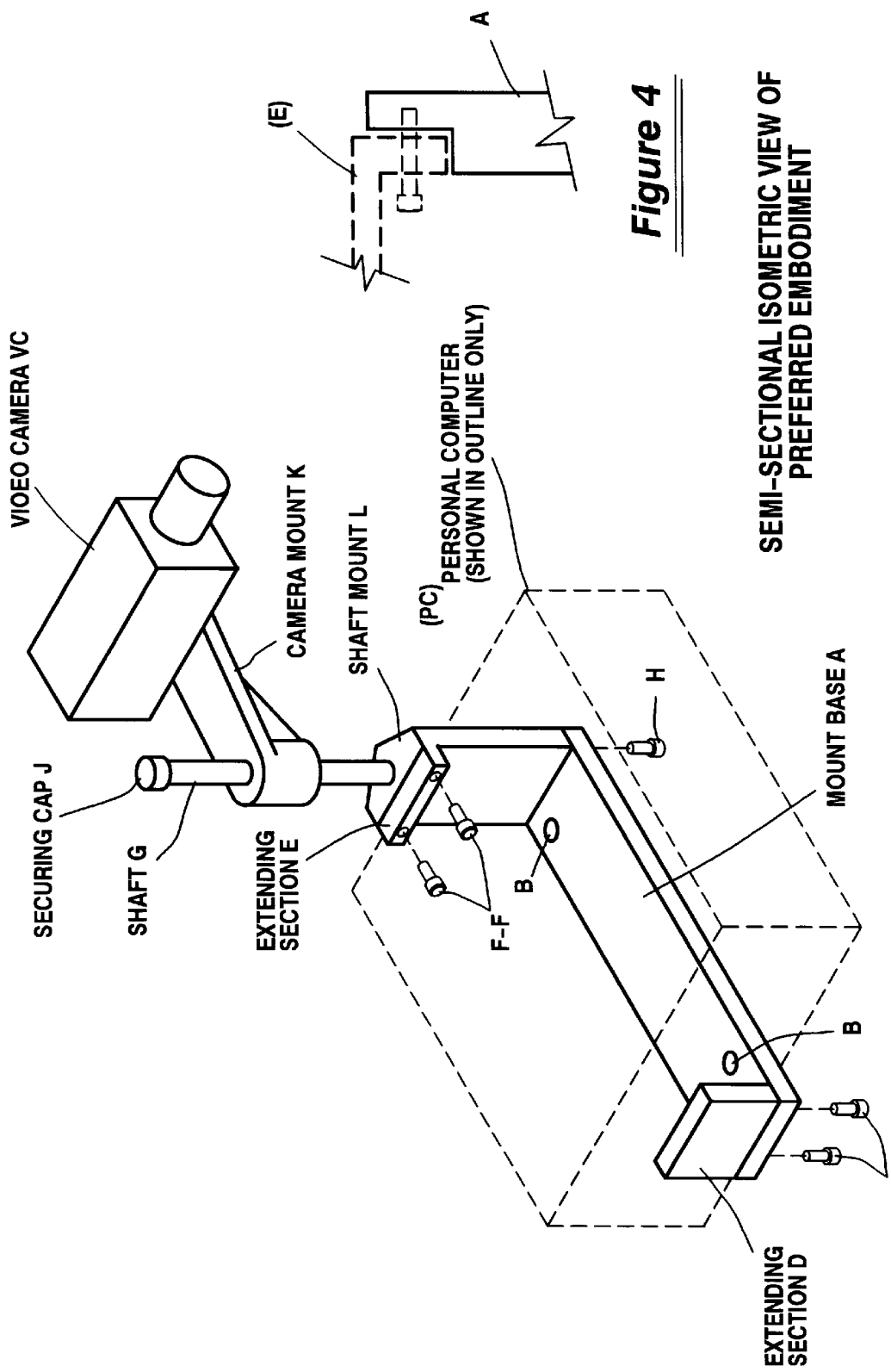
FIG. 1 shows a semi-sectional isometric view of the preferred embodiment for mounting a computer and camera together.
Figure 2:
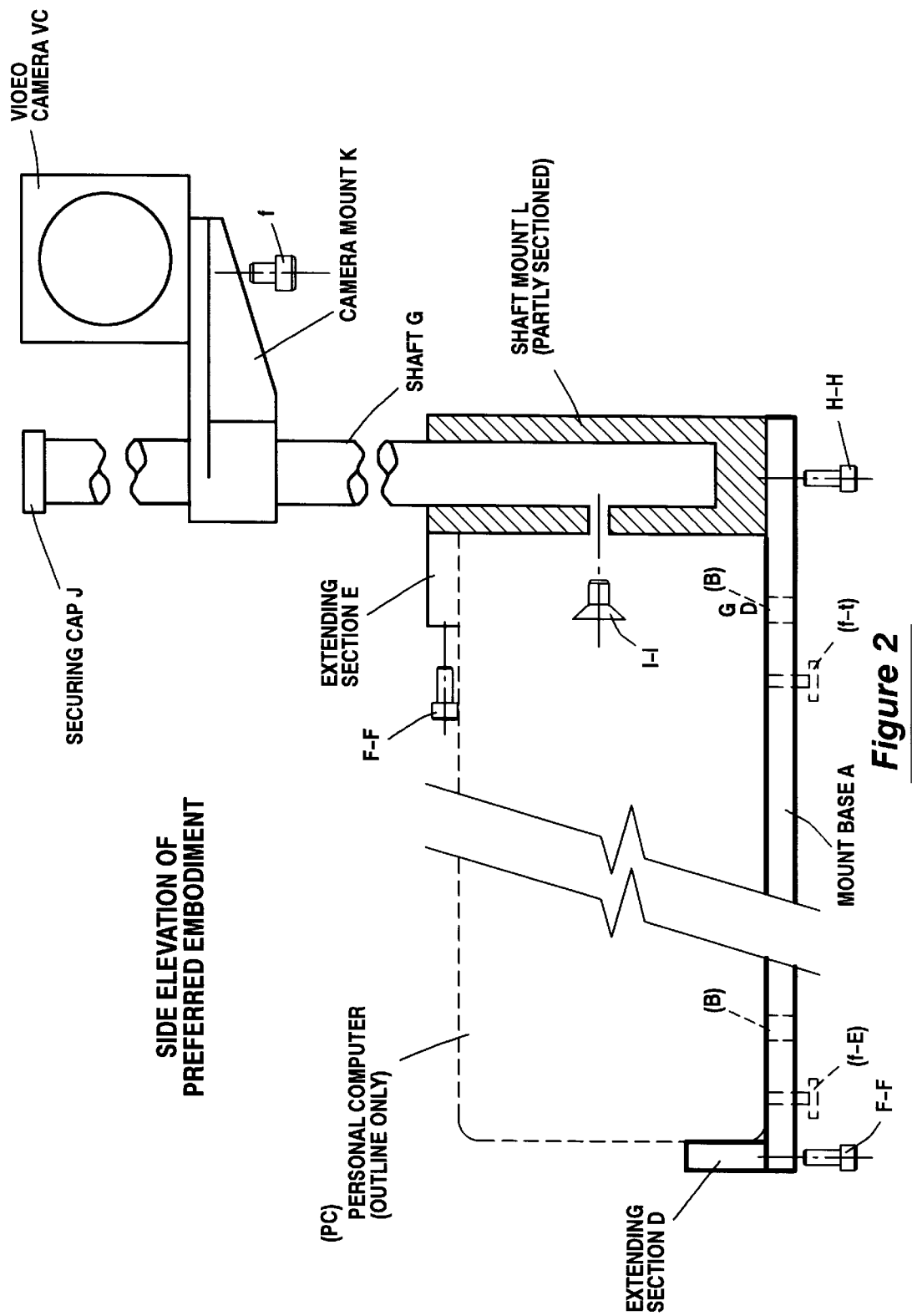
FIG. 2 shows a side elevation of this embodiment.
Figure 3:
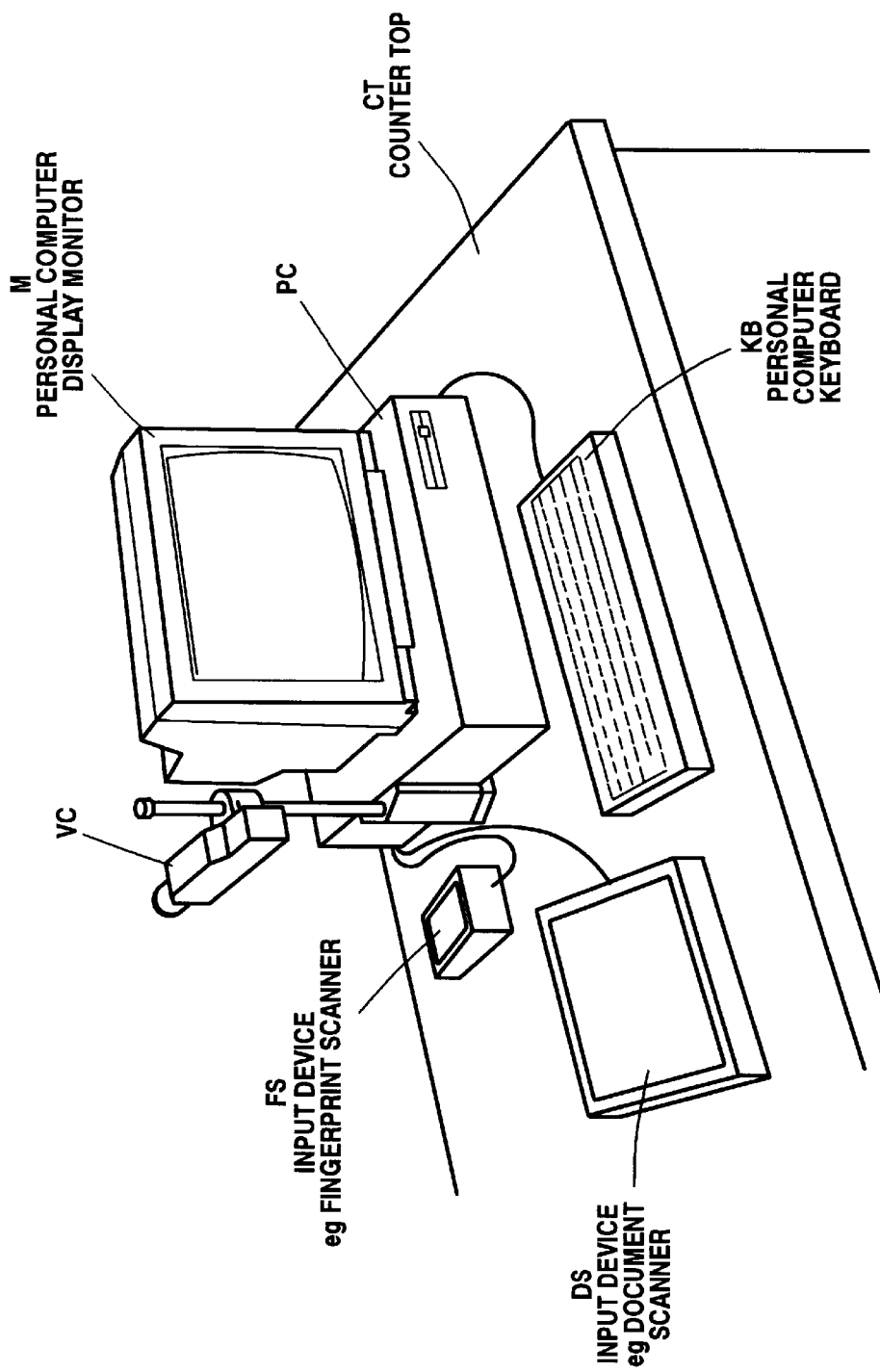
FIG. 3 shows a layout of a typical countertop credentialling system apt for using this embodiment.

With reference to FIG. 1, the mounting arrangement comprises a mount base A, which contains provision B—B (bolts, bolt-holes) for securing to a flat surface, such as a countertop CT (FIG. 3). A personal computer PC (shown in dotted outline) will be understood as to be located on top of mount base A, and secured therein. Base A is to be clamped atop counter CT, with PC placed thereon, being prevented from rocking by means of adjustable, locating feet f—f. Mount base A includes a distal side section D to engage one side of computer PC (see FIG. 2) and a shaft-mounting proximal side section L disposed opposite side D on base A and adapted to engage the opposite side of computer PC. A top section E is attached to side L securely, e.g., via tamper-proof bolts FF or the like (see FIG. 2) or by "hiding" behind PC (e.g., as in FIG. 4). It will be understood that computer PC is thus effectively trapped and secured by base A, sides D, L (and top E) and so cannot be separated from the mounting arrangement without disassembly (unbolting of A from Counter).

Top E may also be otherwise fastened to side L (e.g., made L-shaped), with its fasteners located to be "hidden" by the PC as in FIG. 4. Once pieces D, L, E are fastened to base A, the PC may be placed atop base A, with its extensible feet FT extended to lock it atop the counter (e.g., vs sidewise movement), then the bolts B—B will be tightened to lock the mount, and PC therein, onto the counter. Now, the PC is held captured in one sidewise direction by sides D,L; in the up/down direction by top E, and in the forward-back direction by engagement of its feet ft vs counter CT. Now, the PC itself cannot be moved without unbolting the mount from the counter (bolts B—B), while so fastening base A to counter CT "hides" fasteners F—F, H—H and feet ft—so that the mount and PC therein cannot readily be removed without removing bolts B—B (and access to these may be restricted by locks on a door over the desk cavity under CT, as workers will realize).

Shaft mount (side) L not only helps capture computer PC, but also houses a vertical shaft means G, on which camera mount means K is mounted. The camera will be adapted for vertical-positioning along shaft G and for rotational-positioning about the axis of shaft G. The upper end of shaft G is preferably provided with a securing cap T, permanently attached thereon to prevent the camera mount K from being removed. Video camera means VC is then mounted to the outer end of camera mount K by means of a fastener f, which is adapted to attach to the standard ¼-20 camera mounting base provided on all such cameras. If desired, fastener f may be a tamper proof, lockable fastener, (not shown, but well understood in the art) to discourage theft of the camera.

With reference to FIG. 2, it will be understood that this embodiment may be assembled with conventional screw fasteners so that most of the securing means are inaccessible. For example, mount base A may be attached to the countertop by means of securing bolts B—B, which may be covered by the PL and rendered inaccessible under the counter top. Shaft mount L may be assembled to mount base A by means of vertical screws H—H, entering from below, and similarly for side D (screws F—F). These are, in turn, rendered inaccessible by the bolting of mount base A to the countertop CT, as described. Vertical shaft G may be mounted to shaft mount L and affixed thereon by means of screws I—I, which will be covered by installation of personal computer PC. This also renders camera mount K secure from removal, since, with cap J in place, it is captured on shaft G. Then, the only exposed fasteners are fasteners F—F used to attach extending section E and these would preferably be tamper-proof, requiring a unique and proprietary tool to install or remove them—or these may be "hidden" behind PC as per FIG. 4.

Of course sides D,L,E may be otherwise arranged (e.g., cast integral with base A, or welded thereto, etc.) in suitable instances.

Workers will appreciate that, where a still camera has been conventionally used in similar instances, here, a video camera, or digital electronic equivalent, is stipulated so as to automatically provide digital, "electronic image", data signals therefrom to readily be input to the other described electronic components (e.g., memory, processor, magnetic stripe encoder, etc.) in the overall network (FIG. 3).

We prefer to construct the mount parts of cast aluminum, suitably machined as required to perform the various functions described. However, workers will understand that the device may be constructed with a wide range of other apt and suitable materials and/or methods.

Provision is made to adjust camera mount K vertically along shaft G and also rotationally about the axis of shaft G, and to then lock K in any desired position. In the instant case, locking is preferably provided by means of a locking screw or the like (not shown but known in the art). And workers will understand that this function may be provided in a number of other different ways, e.g., by a friction clamp, or a counterbalance system, or other device, as dictated by the particular requirements of a given application. These degrees of adjustment will permit an operator to advantageously aim the camera to obtain the correct image, as dictated by user requirements.

FIG. 3 shows an exemplary layout of a countertop credentialling system S apt for using embodiments like that of FIGS. 1, 2. System S comprises a personal computer PC assembled with a video camera VC on a mounting system as shown in FIGS. 1 and 2 (and described above), along with an associated display monitor M and keyboard KB, by which the system is controlled. Also shown are exemplary input devices which might be employed in such a system, such as a thumbprint reader FS, a signature pad SP and document scanner DS for recording digital facsimiles of associated documents.

It will be understood that the foregoing construction of the preferred embodiment advantageously permits the display monitor to be located on top of personal computer PC, minimizing the counter space taken up by the system, and that the camera mount is so constructed and adapted as to be symmetrical and reversible, while also capable of being mounted to either side of the personal computer, as the demands of a particular system may dictate.

Results

Statewide System for Issuance of Licenses

The foregoing may be advantageously used to implement a novel state-wide system for quick, easy, inexpensive, secure issuance of various "photo-credentials", such as driver's licenses; where the applicant's picture may be taken and applied to a new license document while he waits.

A preferred version comprises a large number of PC-based photo imaging systems operating at various DMV locations across a state, with mobile units also available for use in remote locations. Each system preferably includes a Unisys "PW² Advantage Plus 486-based" workstation or the like as the PC, a Hitachi video camera and video printer, an Inforite electronic signature pad, and a die-cut and laminate machine. A statewide network connects the systems to a "Unisys U6000/65 Series" UNIX client/server system and a compatible Hitachi host-mainframe (e.g., located at state DMV headquarters).

Figure 5:
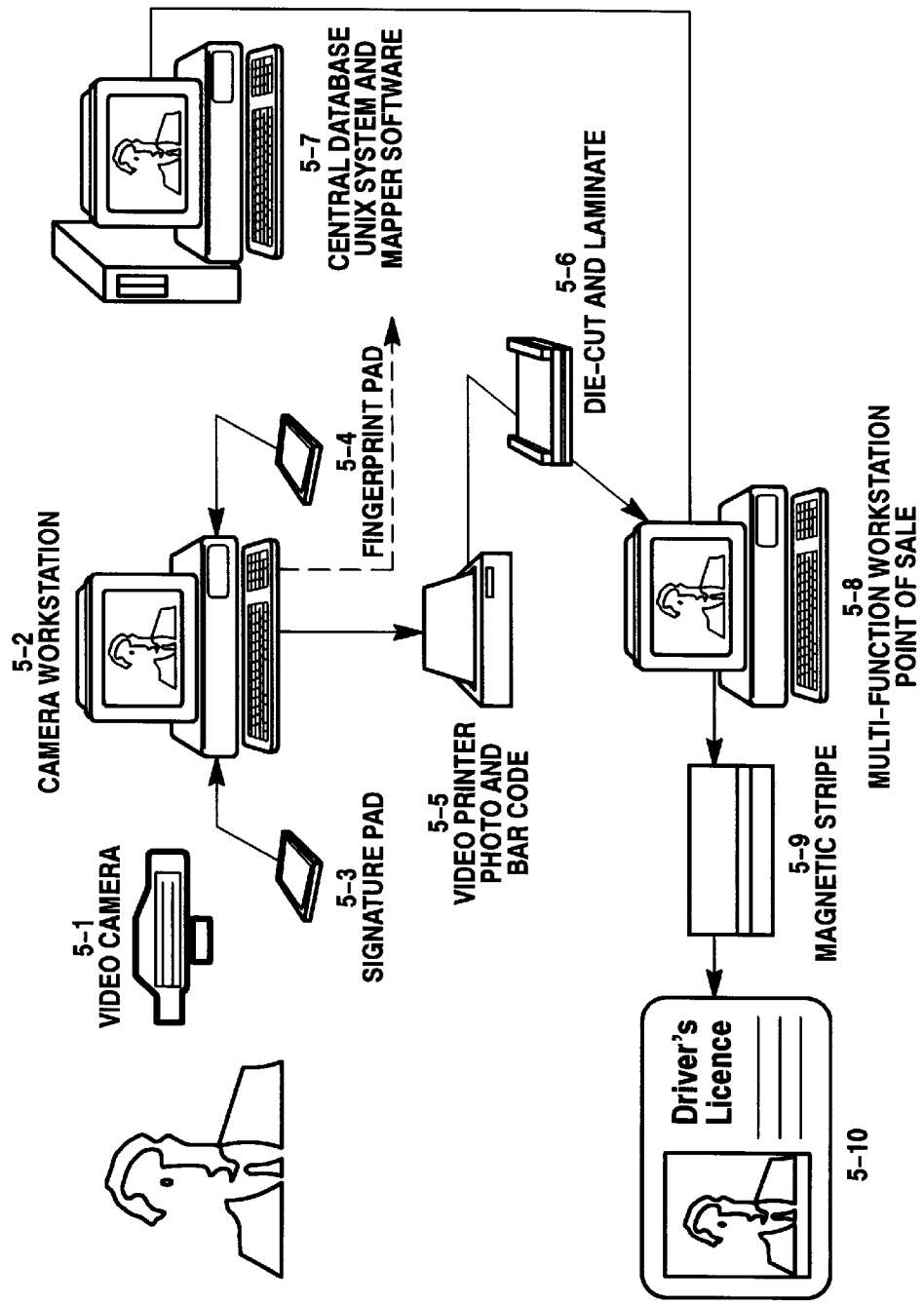
FIG. 5 is a functional layout of a preferred "global system".

Such a preferred "global system" is functionally depicted in FIG. 5. Here, a video camera 5-1 will be understood as capturing an applicant's image in digital form and inputting this to a camera-workstation 5-2 (which may be supplied with a signature pad 5-3, for capturing the applicant's signature, and with a finger print pad 5-4 to capture his prints, as known in the art). Workstation 5-2 is arranged to output all information to a central database (e.g., UNIX server) system 5-7, and (at least some) information to a Video Print station 5-5 (e.g. here picture, and associated ID information printed-out e.g., converting the latter to bar code). Print station 5-5 supplies the output-document (e.g., license 5-10) which can then be "packaged" for security (e.g., die-cut, laminated at station 5-6).

Other workstations in the network (e.g., station 5-8, at a bank or retail outlet or mobile unit in a police vehicle) can use the so-generated document 5-10 in various useful ways; e.g., processing it, reading-out the ID bar code imprinted thereon to generate local verification indicia (e.g., call-up Licensee's picture on screen) and "global input/output (e.g., send some or all of such identification signals to Central Database 5-7, and receive-back related updated data, such as credit records, motor vehicle record, criminal record, etc.).

This imaging system may be integrated with, for example, an existing IBM SNA network and Hitachi mainframe. This solution, preferably comprises a number of PC-based imaging stations that include a Hitachi video camera and video printer, a "PW2 Advantage Plus 486" Unisys workstation, an Elcom encoder and a machine for die-cutting and laminating. Each station (e.g., at local DMV offices, with others at mobile units that serve outlying locations) are connected to the U6000/65 Unix server and the Hitachi mainframe located at DMV headquarters.

The U6000 can store the digitized photos and signatures, and the Hitachi store demographic data such as drivers' names, addresses and license numbers.

The license-making transaction is preferably driven by an application written in Unisys Mapper language that leads DMV users through the process with GUI screens. The Mapper program resides on each PC in the system, such as one written in "III" for retrieving digitized images; the Hitachi holds a C program to handle the demographic information.

A program on the U6000 called MLink preferably interfaces with each of the workstations. Using five modems, Mlink automatically dials each PC to download the information and photos collected that day.

The system can process a driver's license in five minutes, with digitized photo and signature plus a magnetic stripe encoded with information about the driver. In the future, that stripe—or possibly an additional stripe—could hold other vital information, such as medical history, insurance information or phone numbers of relatives.

DMV employees can thus use such a system to capture digitized images of drivers license-applicants and their signatures, to concurrently retrieve related demographic data from the Hitachi mainframe, to combine the images and data on the PC screen (monitor M; e.g., for operator-approval), and to print out and laminate the driver's licenses. Each day, the system can automatically transmit new photo and signature images to a central data repository—the Unisys U6000/65 Series client/server system—for storage and maintenance.

This license-imaging solution can provide motorists with a tamper-proof driver's license, over-the-counter, in less than five minutes. The license features a high-quality color photo, with a fluorescent laminate cover to discourage fraud and prevent license misuse. On the back, the license preferably has the noted magnetic stripe that is encoded with demographic information, including the driver's name, address and license number (e.g., for machine-reading).

This system enables a DMV to provide motorists with improved service and licenses—all with no initial capital investment or recurring costs related to system support and maintenance. The imaging solution gives centralized control over both demographic data and digitized photo images, while still providing vehicle operators with the convenience of obtaining their licenses "instantly", over-the-counter.

While states can currently offer computer-generated licenses, this system is believed to be the first to offer instant access to both digitized photos and demographic information over a statewide network. This is a great convenience to motorists, who can go to any DMV site in the state for a license; it also helps the state reduce license fraud.

In the future, the magnetic stripe on the back of the licenses will enable police officers to automatically access, and retrieve driving records from computers installed in their patrol cars (or bar code may be substituted). Other state agencies may use the licenses for other purposes, such as tracking parents enrolled in child support programs. The system can be expanded to also capture digitized images of fingerprints, and so better ensure the proper identification of a license holder, and give further protection against license fraud.

Other Uses

1. Photo retake

The described system can offer "vain" license applicants a second chance when they have their picture taken for their license. The system combines video and other technologies for digitized photos and signatures. The driver's license applicant gets a look at the video frame that would be chosen, and if he doesn't like it, he can step back in front of the camera and try again. Merely offering such "second chances" should satisfy many possible-complainers, even if they don't avail themselves.

2. Quicker, more secure issuance:

The old way of processing driver's licenses—which included photo processing with hazardous chemicals—was outdated, also it was fairly easy to falsify license information to obtain a driver's license in someone else's name.

The latter has been a problem for college towns where students under the legal drinking age could get licenses by simply providing an older person's birth certificate at any DMV office. The security issue can be a leading reason for utilizing this new driver's license system.

With the new system, fake IDs are much harder to come by. Also, the laminated cover provides a physical barrier against license tampering, and the digitized photos and signatures are available on a statewide network. This allows DMV workers and police officers to quickly confirm an individual's identity.

In conclusion, it will be understood that the preferred embodiments described herein are only exemplary, and that the invention is capable of many modifications and variations of construction, arrangement and use without departing from the spirit of the claims, and accordingly, the present invention is to be considered as including all possible modifications and variations coming within the scope of the invention as defined by the claims appended hereto.

What is claimed is:

1. An arrangement for mounting a computer unit and a camera unit securely on a flat support surface, this arrangement comprising:

camera mount means including extended shaft means and associated fixture means adapted to receive and retain said camera unit to be adjustably positioned thereon; and planar base means adapted to be affixed to said support surface, and to engage a bottom surface of said computer unit; first and second side means coupled to said base means and projected orthogonally therefrom at respective opposite ends thereof, being adapted to engage opposing sides of said computer unit;

one of said side means including a top portion projected orthogonally therefrom and adapted to engage a top surface of said computer unit, opposite said bottom surface thereof; one of said side means being adapted to mount said shaft means.

2. The arrangement of claim 1, wherein said base means and side means include removable fastener means arranged to be hidden when a said computer unit is enclosed thereby.

3. The arrangement of claim 2, wherein said shaft means is adapted to be mounted, lockingly, in one said side means.

4. The arrangement of claim 3, wherein said fixture means is pivotingly mounted on said shaft means.

5. The arrangement of claim 4, wherein lock-fastener means is arranged to secure said shaft means in said side means, while being hidden and inaccessible when said computer unit is so enclosed.

6. The arrangement of claim 4, wherein said fixture means is also adapted to be slidingly positioned along the shaft means.

7. The arrangement of claim 6, wherein locking cap means is disposed on said shaft means to secure said fixture means thereon against unauthorized removal.

8. The arrangement of claim 3, wherein said side means mounting said shaft means includes a pocket adapted to receive the shaft means.

9. The arrangement of claim 1, wherein said side means are dimensioned, with said base means, to closely surround and enclose a prescribed personal computer; and wherein said base means is adapted to be removably affixed on a working surface.

10. A method of co-mounting a computer unit and a camera unit securely on a flat support surface, this method comprising:

providing camera mount means including extended shaft means and associated fixture means adapted to receive and retain said camera unit to be adjustably positioned thereon;

providing planar base means adapted to be affixed to said support surface, and to engage a bottom surface of said computer unit; with first and second side means coupled to said base means and projected orthogonally therefrom at respective opposite ends thereof, and being adapted to engage opposing sides of said computer unit;

making one of said side means to include a top portion projected orthogonally therefrom and adapted to engage a top surface of said computer unit, opposite said bottom surface thereof; and adapting one of said side means to mount said shaft means.

11. The method of claim 10, wherein said base means and side means are made to include removable fastener means arranged to be hidden when a said computer unit is enclosed there by.

12. The method of claim 11, wherein said side means mounting said shaft means includes a pocket adapted to receive the shaft means.

13. The method of claim 10, wherein said shaft means is adapted to be mounted, lockingly, in one said side means.

14. The method of claim 13, wherein said fixture means is pivotingly mounted on said shaft means.

15. The method of claim 14, wherein lock-fastener means is arranged to secure said shaft means in said side means, while being hidden and inaccessible when said computer unit is so enclosed.

16. The method of claim 14, wherein said fixture means is also adapted to be slidingly positioned along the shaft means.

17. The method of claim 16, wherein locking cap means is disposed on said shaft means to secure said fixture means thereon against unauthorized removal.

18. The method of claim 10, wherein said side means are dimensioned, with said base means, to closely surround and enclose a prescribed/personal computer; and wherein said base means is adapted to be removably affixed on a working surface.

19. An arrangement for mounting data processing equipment and a camera unit securely on a flat support surface, this arrangement comprising:

camera mount means including extended shaft means and associated fixture means adapted to receive and retain said camera unit to be adjustably positioned thereon; and security mount means including base, side and top members for partially enclosing said equipment, with a said side member arranged to securely mount said shaft means.

20. A method of co-mounting an array of data processing equipment and a camera unit securely on a flat support surface, this method comprising:

providing camera mount means including extended shaft means and associated fixture means adapted to receive and retain said camera unit to be adjustably positioned thereon; and providing security-mount means adapted to be affixed to said support surface, and including base, side and top members for partially enclosing said equipment; while arranging a said side member to receive and securely mount said shaft means.

21. A mounting arrangement for co-mounting a data processing unit and associated camera means to be integrated securely on a flat support surface this mounting arrangement comprising:

camera mount means including extended shaft means and associated fixture means disposed on said shaft means and arranged to receive and retain said camera means to be adjustably positioned thereon; and security housing means including base means with associated fastener means and side members for partially enclosing said unit, with a said side member including cavity means arranged to securely mount said shaft means via lock means; and with at least one side member including retention means projected therefrom over said unit for retention thereof in said security housing means so that, with said unit in place in said security housing means, access to said fastener means and said lock means is hidden and prevented.

* * * * *